Patented Mar. 5, 1935

1,993,270

UNITED STATES PATENT OFFICE 1,993,270

ALCOHOL DENATURANT

Per K. Frolich and Floyd Laverne Miller, Elizabeth, N. J., assignors to Standard Oil Development Company, a corporation of Delaware No Drawing. Application August 3, 1931,
Serial No. 554,937

6 Claims. (Cl. 202—77)

This invention relates to a new improved denaturant such as for potable alcohols and more especially to an organic liquid product containing organically combined sulfur and produced by hydroxylation as by chlorination and hydrolysis of liquid organic material containing combined sulfur such as the distillates and products of hydrolysis obtainable from spent acid or caustic solutions used in treating petroleum oils and the like.

It is known that oily materials containing combined sulfur and produced by steam distillation or like methods from spent acids used in treating petroleum oils are suitable denaturants for ethyl alcohol and such have indeed been adopted as standard denaturants by the U. S. Government under the name of "alcotate". While alcotate is a very satisfactory denaturant in alcohol in that it renders the alcohol nauseating and undrinkable, the alcotate nevertheless possesses disadvantages due to its odor and to the ease with which it may be removed by dilution of the alcohol with water, filtration through active charcoal or other absorbents and similar means.

It has now been found that denaturants similar, in respect to their nauseating action, to alcotate and markedly superior in that they are much more difficult to remove from mixtures with ethyl alcohol may be produced by chlorination and hydrolysis of alcotate itself, or of other organic liquids containing combined sulfur and obtained by neutralization or steam distillation of acid or caustic used for treating petroleum oils, and of other compounds which may be derived from such liquids. Amongst such compounds may be mentioned pure compounds such as mercaptans, thio-ethers, di-sulfides, thio-esters and the like, and also the complex mixtures as may be obtained from petroleum. For example mixed mercaptans may be obtained by steam distillation of caustic soda used for treating light cracked naphthas and mixtures of di-sulfides or thio-ethers may be prepared from these mercaptans by limited dehydrogenation or by removal of hydrogen sulfide, respectively.

In this method for preparing improved denaturants any suitable organic sulfur-containing liquid as described above is subjected to the action of free chlorine or other halogen and is subsequently hydrolyzed with an excess of a caustic solution to remove substantially all reactive halogen. The only product of hydrolysis is purified by distillation to meet the required Government specifications for denaturants, or any other distillation specifications, as may be desired. As an example of the operation of this process the following is given:

An organic liquid product obtained by steam distillation of acid sludge from the treatment of a cracked petroleum oil from West Texas crude is redistilled and the fraction boiling between 80 and 150° C. is collected. Gaseous chlorine is passed through this fraction at atmospheric pressure and room temperature until the oil is substantially saturated with chlorine. The chlorinated product possesses a sharp pungent odor, is slightly lachrymatory, and distills between 82 and 210° C. with 90% recovery, and has a chlorine content of about 17% by weight.

The chlorinated product is then mixed with an aqueous solution containing a slight excess of caustic soda above that required for reaction with the total chlorine absorbed and is heated under reflux for about four hours, or until the reaction is substantially completed. The mixture is cooled and an oily product immiscible with the aqueous layer is recovered. This product in one test, had a chlorine content of 7.7%, and a boiling range of 80 to 207° C. with a yield of 85% on the original oil chlorinated. This product is freely miscible with alcohol and possesses marked advantages as a denaturant. This denaturant is more soluble in alcohol-water mixtures than are other accepted denaturants; for example, more than 14 cc. of water are required to produce a turbidity in a 25 cc. sample of alcohol containing 1.5% of this product. This is to be compared with the standard turbidity test for denaturants of the alcotate type which require only 8.0 cc. of water to produce the same turbidity.

The improved denaturant is also superior in that it cannot be completely precipitated from alcohol by the addition of much larger amounts of water and a substantial amount remains in solution even after filtration through active charcoal. This denaturant also possesses a pleasant fruity odor, which permits the use of the denatured alcohol in many industries where alcotate denaturants are objectionable because of the odor.

Other halogens, such as bromine or iodine, may be used in place of chlorine in the chlorination step and the oil may be subjected to less extensive chlorination than described, for saturation, though desirable, is not necessary. The hydrolysis may be conducted with other caustic agents or with acids, as will be understood according to the known art. More extensive hydrolysis may be secured by conducting this step under increased pressures, and products possessing even better denaturant properties, such as increased miscibility with alcohol-water mixtures, may be secured thereby. Any traces of residual reactive chlorine may be removed by contacting the hydrolyzed oil with active metals, such as sodium or potassium, or other reactive and preferably non-toxic metals.

The boiling range of the material subjected to our process for the production of improved denaturants is primarily dependent on the desired boiling range and density of the finished denaturant, and may vary widely without materially affecting the denaturant qualities of the product. Feed stock of proper boiling range, density, and sulfur content may be selected so as to provide denaturants meeting any predetermined specifications, as will be understood. In general it is preferable to select a stock having a sulfur content above about 4 or 5%, and the sulfur may be as high as 10 or 20% or even higher.

The improved denaturant may be used alone as a satisfactory denaturant for ethyl alcohol, or it may be mixed with other substances such as non-potable alcohols, esters, denaturants of the alcotate type petroleum hydrocarbons, and the like, which may act merely as diluents, or may impart additional denaturant qualities.

Various changes may be made within the scope of the appended claims in which it is desired to claim all novelty inherent in the invention as broadly as the prior art permits.

We claim:

1. A new composition of matter comprising a solution containing chiefly ethyl alcohol and a small amount of a liquid containing combined sulfur not directly linked to oxygen and produced by hydroxylation of organic materials containing combined sulfur.

2. A new composition of matter comprising an organic liquid containing combined sulfur not directly linked to oxygen and produced by hydroxylation of a class or organic sulfur compounds derived from petroleum including mercaptans, thio-ethers and di-sulfides.

3. An improved liquid organic denaturant comprising a product of chlorination and hydrolysis of an acid sludge distillate of a boiling range of 80 to 150° C. and containing 4 to 10% sulfur.

4. An improved method of producing liquid organic denaturants comprising chlorinating an organic liquid containing combined sulfur and derived from petroleum oils with gaseous chlorine and subsequently hydrolyzing the product by subjecting it with an aqueous alkaline solution to a temperature substantially equal to the boiling point of the mixture.

5. An improved process for the production of liquid organic denaturants comprising passing chlorine at ordinary temperatures and pressures through an organic liquid containing combined sulfur and derived from petroleum oils until the liquid contains more than 15% by weight of combined chlorine, then hydrolyzing the chlorinated product with an excess of caustic soda to remove substantially all reactive chlorine, cooling and removing an oily product immiscible with aqueous caustic.

6. An improved liquid organic denaturant boiling between 82 and 210° C. produced by chlorination of an organic liquid containing combined sulfur not directly linked to oxygen and derived from petroleum oils to more than 15% by weight of chlorine, treating the product under reflux with excess aqueous caustic to remove substantially all reactive chlorine, separating the oil and distilling it to produce a denaturant of suitable boiling range, said denaturant having a turbidity test above 14 cc. of water.

PER K. FROLICH.
F. LAVERNE MILLER.